Nov. 26, 1968     K. EICKMANN     3,412,686
MEANS FOR SEALING SLOT SPACES AND DIVIDED VANES
IN FLUID HANDLING DEVICES
Filed May 22, 1967     5 Sheets-Sheet 1

INVENTOR
KARL EICKMANN

BY Michael S. Striker

ATTORNEY

INVENTOR
KARL EICKMANN

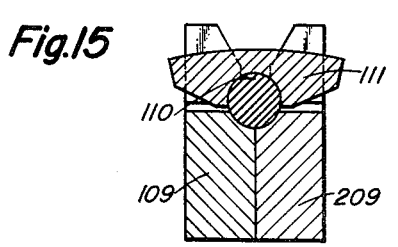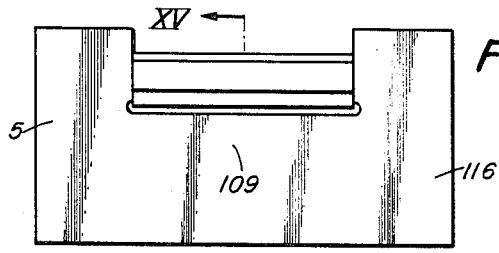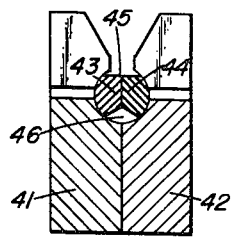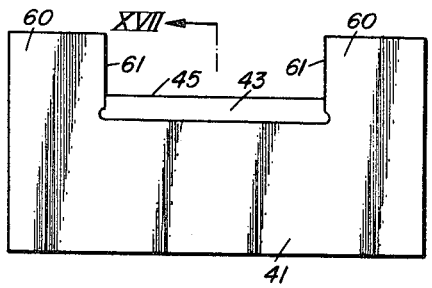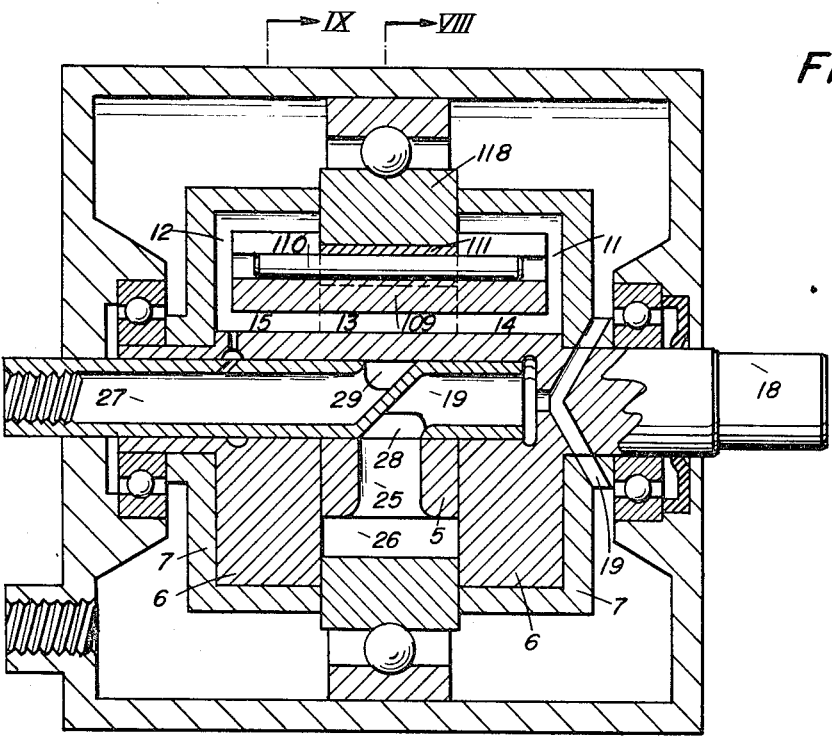

Nov. 26, 1968  K. EICKMANN  3,412,686
MEANS FOR SEALING SLOT SPACES AND DIVIDED VANES
IN FLUID HANDLING DEVICES
Filed May 22, 1967  5 Sheets-Sheet 4

INVENTOR
KARL EICKMANN

BY Michael S. Striker

ATTORNEY

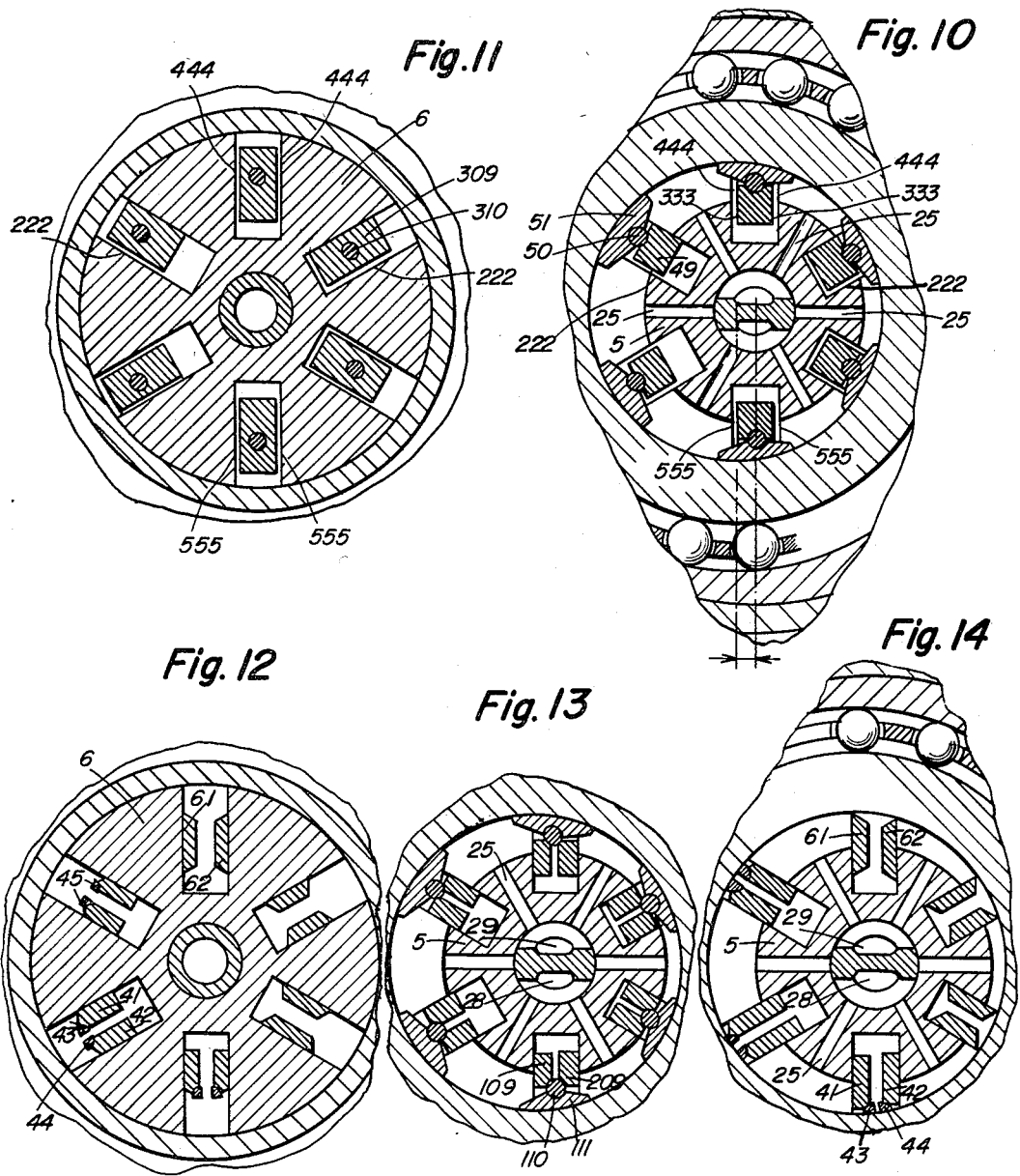

United States Patent Office 3,412,686
Patented Nov. 26, 1968

3,412,686
MEANS FOR SEALING SLOT SPACES AND DIVIDED VANES IN FLUID HANDLING DEVICES
Karl Eickmann, 2420 Isshiki, Hayama-machi, Kanagawa-ken, Japan
Continuation-in-part of application Ser. No. 328,395, Dec. 5, 1963. This application May 22, 1967, Ser. No. 640,139
11 Claims. (Cl. 103—136)

ABSTRACT OF THE DISCLOSURE

In fluid handling devices gases or liquid flows through working chambers which are formed between an enclosure body, a slotted rotor body and end walls thereof and which are divided into individual intervane spaces by vanes or vane assemblies composed of two vane ports which are located and moving in slots in the slotted body and end walls thereof. The slots in the body and the end walls thereof form chambers, which are sealed by divided vanes against the adjacent individual intervane spacer, so that no fluid can escape from slots into intervane spaces or vice versa.

---

This application is a continuation-in-part of my U.S. patent application Ser. No. 328,395 filed Dec. 5, 1963, now U.S. Patent No. 3,320,898.

A typical fluid handling device is disclosed in my U.S.A. Patent 2,975,716 and it has a body, rotor, which is provided with slots, which extend into end walls of the rotor or body and wherein the medial portion of the rotor is radially surrounded by a casing means and axially flanged by portions of the end walls of the rotor, so that a working space is formed between the closure member, the slotted body, its end walls and the working space is divided into individual intervane spaces by vanes located and moving in the slots and vane extensions extend into the slot extensions in the end walls of the slots containing body. Those fluid handling devices became capable to high pressure because of the guiding of the vane extensions in slot portions in the end walls of the rotor. Vane assemblies were inserted into such kind of fluid machines, as disclosed in my U.S. Patents 3,099,964 and 3,158,103 for example. They improved the seal of the individual intervane spaces.

The vane bodies however were integral bodies of a certain thickness and a small clearance remained between the walls of the slots and the vane's body, so that the vane remained able to travel inwards and outwards in those slots. It has now been discovered, that for example, those intervane spaces, which had low pressure, while high pressure was in the slots, received leakage out of the neighbouring slot or slots through the clearance between vane and slot wall or through the corners or faces between intervane spaces and slot portions in end walls of the rotor, reducing the efficiency of the machine. Known divided vanes could not solve the problem, because they were not extended into the end walls.

The object of the invention is therefore, to seal the individual working chambers under all conditions against the slot spaces in such fluid handling devices.

The object of the invention is achieved by the provision of a vane or vane assembly, which has extensions into the slots in the end walls of the slots provided body, and wherein the vane assembly is divided longitudinally and formed with a means for engaging the face of the enclosure body and the face of a slot wall in an end wall of the rotor body, while each vane part is pressed against a slot wall and at least one vane portion maintains a seal between slot and intervane space.

Brief description of the drawings

For an understanding of the principle of the invention reference is made to the following description of typical embodiments thereof as illustrated in the accompanying drawings.

In the drawings:

FIGURE 7 is a longitudinal sectional view through another embodiment of a fluid handling device;
FIGURE 10 is a cross-sectional view through FIGURE 7 along the line VIII—VIII and showing vanes of the prior art;
FIGURE 11 is a cross-sectional view through FIGURE 7 along the line VIII—VIII and showing vanes of the prior art;
FIGURE 12 is a cross-sectional view through FIGURE 7 along the line IX—IX, but showing two different embodiments of divided vanes are assembled into the machine of this figure;
FIGURE 13 is a cross-sectional view through FIGURE 7 taken along the line VIII—VIII but containing a modified embodiment of divided vanes of the invention;
FIGURE 14 is a cross-sectional view through FIGURE 7 taken along the line VIII—VIII, but containing two embodiments of divided vanes of FIGURE 12;
FIGURE 15 is a cross-sectional view through FIGURE 16 along the line XV—XV;
FIGURE 16 is a view onto a vane assembly of an embodiment of the invention;
FIGURE 17 is a cross-sectional view through FIGURE 18 taken along the line XVII—XVII;
and
FIGURE 18 shows a view onto another embodiment of a vane assembly of the invention.

Referring now to FIGURES 1–3, 15 and 16, it will be seen that the vane 9 is divided longitudinally of a plane of symmetry embodiment through the center line of the longitudinal bearing groove or vane bed 10A. If that is a fact, then the first vane part 109 and the second vane part 209, may be equal in dimension and may be symmetrical parts which are divided by the symmetrical face or dividing face 10D.

Figure 1:
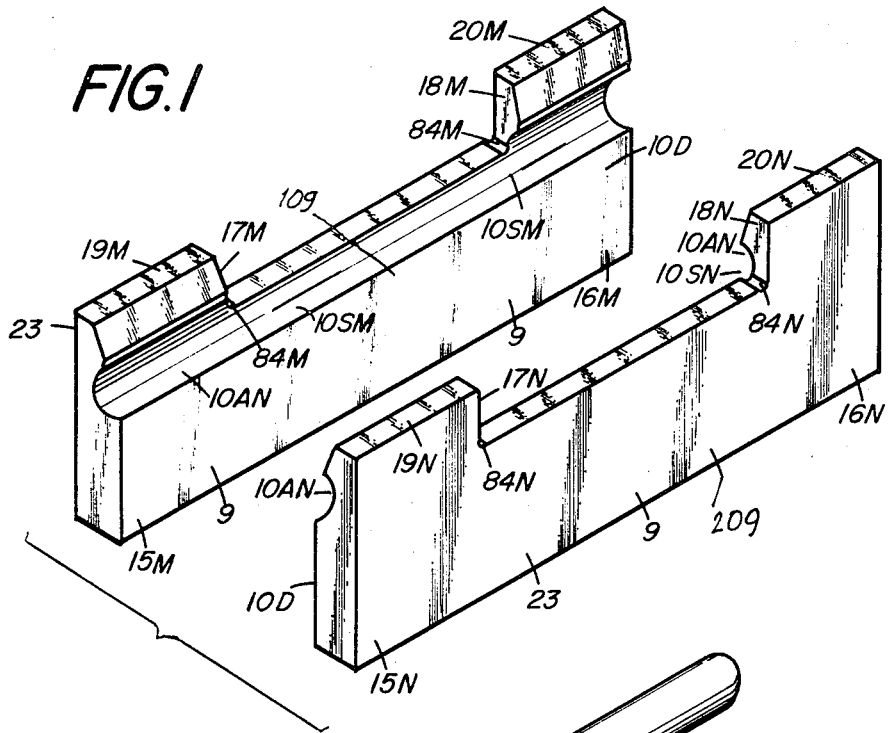
FIGURE 1 shows vane-body parts in a perspective view.

Each one dividing face 10D remains on the first vane part 109 and on the second vane part 209.

Bearing faces 23 of the first vane part 109 and of the second vane part 209 are parallel to the dividing face 10D.

The first vane part 109 is provided with the vane axial extension parts 15M and 16M, the vane radial extension parts 19M and 20M, the transversal medial faces 17M and 18M, the vanes longitudinal bed or bearing groove 10AM, the transversal intersecting corner recess 84M and the undisturbed bottom face part 10SM. The second vane part 209 is after the division provided with the vane axial extensions 15N and 16N, the vane radial extensions 19N and 20N, the transversal medial faces 17N and 18N, the longitudinal bed or bearing groove 10AN, the transversal corner recesses 84N and with the undisturbed bottom face parts 10SN.

The pivot member 110 may be a cylindrical bar or pin. The slide shoe element 111 of FIGURE 3 may be provided with a slide element outer face 90, with the slide element longitudinal bed 11A, and with the transversal end faces 21 and 22.

For the assembly of the divided vanes of this embodiment the pivot member 110 may be moved axially into the longitudinal bed 11A. Thereafter, pivot member 110 and slide element 111 may be laid from above or from the front into the longitudinal bed part 10AM or 10AN of the first vane part 43 or second vane part 44 and the transversal end faces 21 and 22 may thereby with a part of it inserted between the respective parts of the transversal medial face 17M and 18M or 17N and 18N. Thereafter, the other vane part may be laid against the former vane part so that both dividing faces 10D abut each other, both vanes longitudinal bed parts 10AM and 10AN abutting the outer face of the pivot member 20 and so that the medial end faces 21 and 22 of slide element 111 are fitted between transversial medial faces 17M, 17N, 18M, and 18N.

Figure 2:
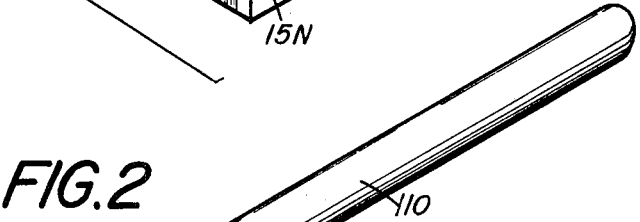
FIGURE 2 shows a pivot member in a perspective view.
Figure 3:
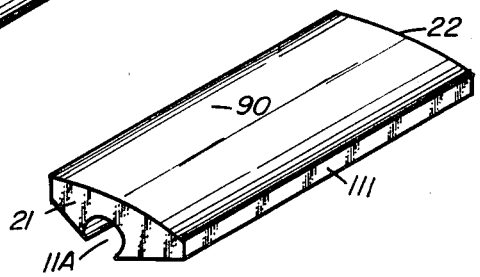
FIGURE 3 shows a slide shoe element of a vane assembly in a perspective view.

The assembly of the vane, consisting of first vane part 109 and second vane parts 209, pivot member 110 and slide element 111, is thereafter completed and the divided vane assembly of FIGURES 1 to 3 is thereafter substantially equal to that of the non-divided vane assembly 49, 50, 51 of FIGURE 10.

Figure 8:
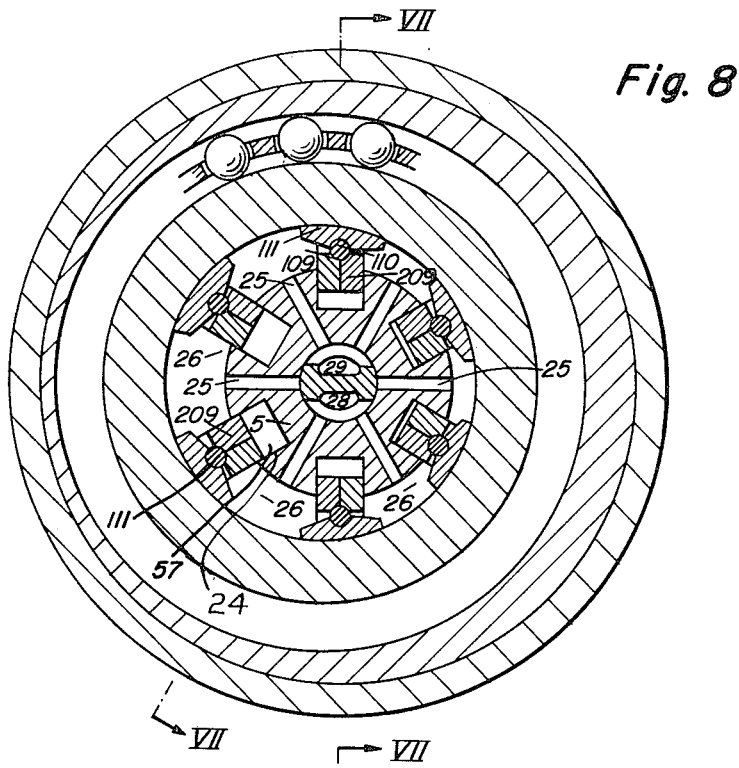
FIGURE 8 is a cross-sectional view through FIGURE 7 along the line VIII—VIII.

After such vane or vane assembly of FIGURES 1 to 3, 15, 16 is inserted into a respective slot 57 of the rotor of the fluid operated or fluid operating machine shown in FIG. 8, the first vane part 109 and the second vane part 209 are kept together by the walls of the said slots 57 or slot extensions because the vanes' longitudinal bearing faces 23 will then be guided by the guide faces 24 of the respective slot.

Leakage from the respective transversal intersecting corner recess 84M into the respective other corner recess 84N is prevented due to the fact, that pivot member 110 seals along the respective undisturbred bottom face parts 10SM and 10SN of the longitudinal bed 10A and thereby prevents leakage from one of the said transversal corner recesses 84M into the other one 84N or vice versa.

The important feature of the divided vane is, that it is very simple to manufacture the first vane part 109 and the second vane part 209 separately and accurately and that it is very simple to assemble the pivot member 10 and the slide element 111 into a vane assembly with the first vane part 43 and the second vane part 44.

Figure 4:
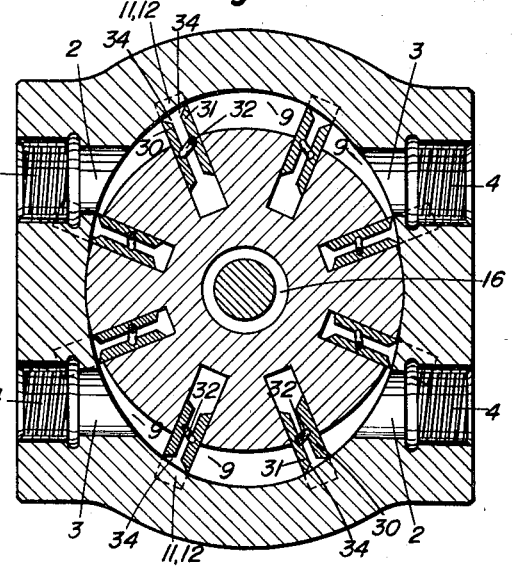
FIGURE 4 shows a cross-sectional view through FIGURE 5 and illustrates a fluid handling device with divided vanes of an embodiment of the invention.
Figure 5:
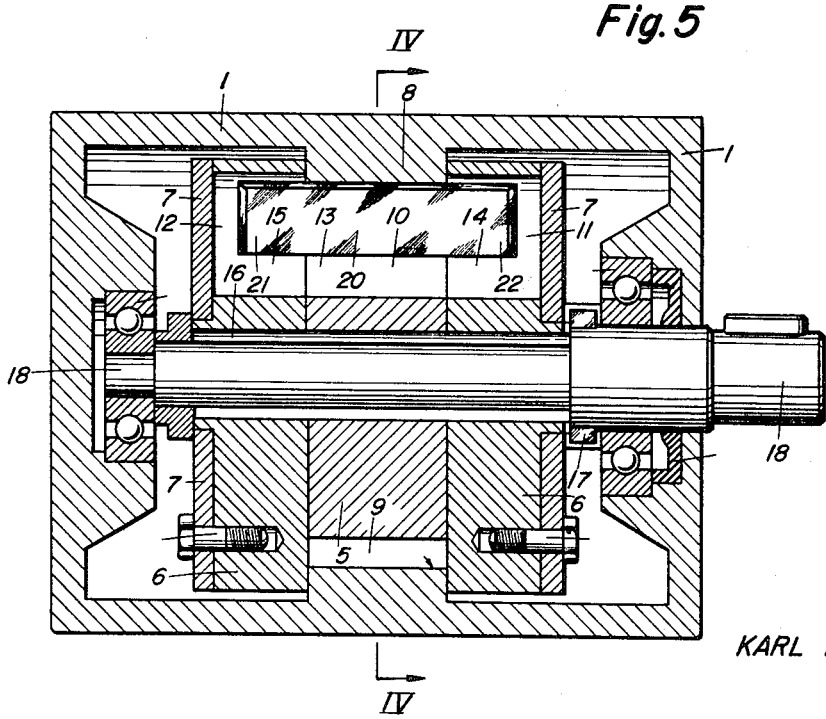
FIGURE 5 is a longitudinal sectional view through a fluid handling device including embodiments of divided vanes of the invention.

In FIGURES 4 and 5 an embodiment of a fluid handling device is shown, whereinto another embodiment of a divided vane of the invention is assembled. In housing 1 a shaft 18 is mounted, which revolves or is revolved by a slotted central body or rotor 5. End walls 6 are assembled on the ends of rotor 5 and extend radially therefrom. They are laterally embracing the intervane spaces 9 and the casing member 8. Slots 10 are provided in the rotor body assembly 5, 6, with a medial slot portion in the medial rotor portion 5, and extended slot portions 14 and 15, 11 and 12 in end walls 6 of the body assembly. The slot portions 11 and 12 are closed axially outwardly by end covers 7. Entrance passages or means and exit passages or means 4 are provided to communicate each one at least with one intervane space 9 for passing fluid thereinto or out thereof. A divided vane assembly is provided in each slot 10 and extends into the slot portions 11 and 12 in end walls 6, wherein the vane assembly is partially guided. The vane assembly is another embodiment of the invention and includes members 30 and 31 of a longitudinally divided vane. Both members 30 and 31 may be symmetric and separated from each other. A distancing means, for example spring means 32 may be provided in the vane assemblies between the two vane ports 30, 31 of the divided vane. Vane parts 30 and 31 may each have an inclined top face. Thus, according to this invention a straight vane edge appears on each member of the divided vane between a longitudinal bearing face thereof and the inclined top face. This vane is to be so assembled, into the fluid handling device, that the straight vane edge of each vane member 30 or 31 partially abuts the inner annular face of the casing member 8 and partially the wall of slot extensions 11 and 12. A sealing means is thus formed along the inner annular face of casing 8 and along the wall of the slot extensions 11 and 12. Each slot 10 is sealed by two vane parts 30 and 31, and by two straight vane edges, one each vane member 30 and 31 abutting the inner face of casing 8 and the respective walls of slot extensions 11 and 12. Each slot 10 and portions 11 and 12 form then a completely closed slot space, communicating each portion thereof through inclined chambers 34 on top of the vane members and through the medial space between the vane members 30 and 31. This space, is according to the invention tightly and completely sealed against both neighbouring intervane spaces by the said straight vane edges, and slot extension-walls.

All leakage from slots into intervane spaces is prevented by this embodiment of the invention, also because, the vane parts or members 30 and 31 are pressed against the slotwalls in their whole, entire, length, without tilting, as in earlier fluid handling devices.

Figure 6:
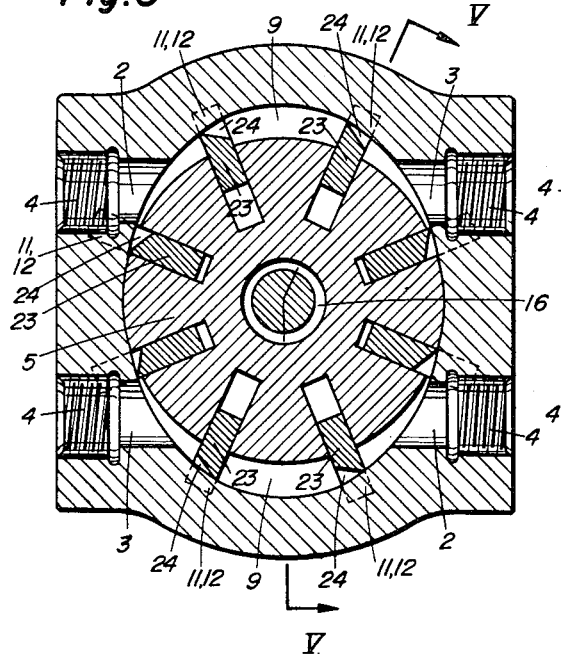
FIGURE 6 is a cross-sectional view through FIGURE 5 but provided with integral vanes.

In the embodiment of FIGURE 6 one piece vanes 23 are inserted into the slots of the rotor assembly of FIGURE 5. Thereby a space is obtained, consisting of exit port 3, the intervane space 9 adjacent the entrance or exit port 3, the communicating space 24 above the top of the inclined vane's outer face and the slot and slot extensions 10, 11, 12 and medial portion 13. A similar space appears for example on the bottom left side of the figure. The sealing of such space takes place by the sealing small clearance between outer face of the medial portion of rotor 5 and the inner face of housing 8 at one peripheral end of the space and by the straight vane edge along the inner face of housing 8 and the wall faces of the slot spaces in the end walls 6 in the other peripheral direction. The straight vane edge along the inner face of housing 8 and along the walls of the slot spaces in end walls and along the vanes bearing face and top face, is therefore an important seal means of the invention.

Figure 9:
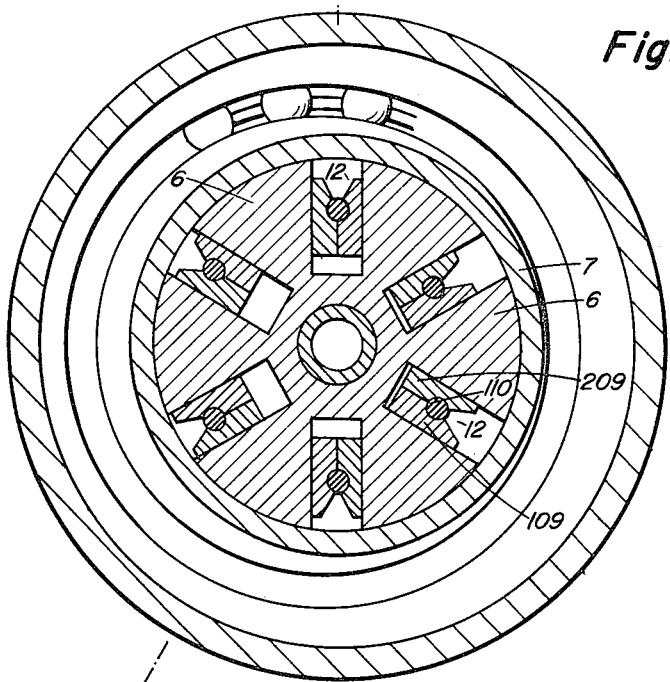
FIGURE 9 is a cross-sectional view through FIGURE 7 along the line IX—IX.

FIGURE 7 shows a longitudinal view through another embodiment of the invention and there are cross-sections provided by FIGURES 8 and 9. Shaft 18 revolves together with rotor 5 and end walls 6 and end covers 7 of the rotor 5 and is rotatably carried by a housing. Intervane spaces are formed in a working chamber between rotor 5, end walls 6 and casing means 118. The working chamber is divided by vanes 109 into the individual intervane spaces 26. Fluid is passed thereinto and out thereof through rotor passages 25, passages 28 and 29 of a control body 27. Slots are provided in the medial rotor portion 5 and extend by means of slot extensions 11 and 12 into the rotor end walls 6. In those slots are vane assemblies located and they move therein outwards and inwards when the machine operates.

The vane assembly provided in the embodiment of FIGURES 7 to 9 consists of two longitudinal vane parts, a pivot pin and a slide shoe element as in FIGURES 1 to 3. FIGURE 8 demonstrates the location of vane parts 109 and 209 in the medial slot portion and rotor portion and how the pivot pin 110 is kept within the longitudinal bearing grooves or vane beds of the vane parts between the vane parts 109 and 209 and how the slide shoe element 111 is kept on the vane assembly by pivot pin, vane extensions and inner face of housing 8. FIGURE 7 shows the location of the vane extensions in the slot extensions in the end walls 6 of rotor 5 in the respective slot portion 12. The pivot pin is kept by the vane extensions and fluid can enter into a recess above the pin between the vane extension parts. The closing by end cover 7 in radial direction of slot extension 12 is also shown.

In FIGURE 10, which is also a cross-section through FIGURE 7, earlier vanes, according to my above mentioned U.S. patents, are shown. Clearances 333 and 555 are shown at an exaggerated scale, which were necessary in order to enable the vane to travel. Assuming now high pressure in the bottom spaces of the fluid handling device as in FIGURE 10, the vane assemblies bordering such high pressure chambers were pressed against the opposite slot walls, leaving clearances 222 to the other slot walls. All lower chambers including the clearances 222 and the associated slots formed together a high pressure chamber group including all slots. Therefore high pressure was also present in the top slot in the figure. Out from this slot in the low pressure intervane spaces area of the machine, in this example, in the upper part of the machine, fluid under pressure leaked through the clearances 333 between the respective vane or vanes and slot wall or slot walls into the neighbouring low pressure containing intervane spaces. This leakage flow was still considerable in my earlier patented machines and the present invention overcomes this leakage flow by the means of the divided vanes or vane assemblies of the invention. FIGURE 11 shows the cross-section through fluid handling devices of my earlier inventions with nondivided vane taken through an end wall of a rotor. It is therefrom visible, how such leakage flow from high pressure slot space into low pressure intervane space also appeared through clearances 444.

FIGURE 13 is a section through the medial rotor portion of FIGURE 7.

Vane parts 109 and 209 of a divided vane shown in FIGURE 13, are assembled in a number of slots of the device by way of example. Pivot pins 110 are kept in the longitudinal vane beds thereof and therebetween, and slide elements 111 are kept on the pivot pins 110. If now the pressure from the slot space acts against the vane assembly, then in the low pressure area of intervane spaces the vane parts move away from each other in direction for close fitting and sliding upon the respective slot walls. Accordingly and in accordance with this invention, the leakage clearances 333 and 444 are prevented, as can be seen by comparison of FIGURES 10 and 11 with FIGURE 13. The vane parts move a little upwards toward the pivot pin 10, but that causes less leakage, than through the clearances 333 and 444. The divided vane assembly of the invention therefore not only is simpler in production and therefore more inexpensive, than my earlier vane assemblies, but in certain applications they also provide a tighter seal of the intervane spaces and of the slot spaces of the device.

An accurate seal of slot spaces is also or even better obtained by another embodiment of a vane assembly of divided vanes of the invention. This is shown in FIGURES 17 and 18 and assembled shown into a fluid handling device of FIGURE 7 in FIGURES 12 and 14 on the left. The pivot pin in this embodiment constitutes a slide element and is divided longitudinally. It has top slide faces 45 complementary to the inner face of the housing 8 and slanted flat bottom faces 46. It is able to swing or pivot in the longitudinal vane beds of the vane parts 41–42, and the parts of the pivot pin are radially moveable against each other in a limited extent, such enabling small radial movements of the vane parts. Tight face-seal contact is maintained by this assembly between inner face of housing 8, outer face portions of pivot pin parts 43 and 44 and vane parts 41 and 42, thus, the slot space is tightly sealed and so are the intervane spaces.

While some specific embodiments have been explained in the specification, it is desired that the invention shall not be limited to the shown embodiments, but whatever novelty resides in the invention, may be protected as defined by the following claims.

What I claim is:

1. Sealing arrangement for a rotary fluid handling machine, in combination, rotor means having an axis and including a central rotor portion having open radial slots, and two end walls having slot extensions axially aligned with the ends of said slots, respectively, to form with the same vane slots, the axial and radial ends of said slot extensions being closed by surfaces of said end walls, each vane slot having circumferentially spaced confronting guide faces and a bottom face connecting said guide faces at the radially inner ends of said vane slots; housing means including a casing having an annular inner surface surrounding said central rotor portion and having the same axial extension, said casing being located between said end walls; and a plurality of divided vane assemblies located in said vane slots, respectively, and having an axial length smaller than the axial length of said vane slots, and greater than the axial length of said open radial slots, and a radial width smaller than the radial width of said slot extensions in said end walls and of said open slots in said central rotor portion, each vane assembly comprising sealing means having the axial length of said inner annular surface and sliding on the same in sealing engagement, and two divided vane parts having central portions located in the respective open radial slot and end portions located in said slot extensions, respectively, each of said divided vane parts having a slide surface sliding on one of said confronting guide faces, respectively, in sealing engagement for sealing, together with said sealing means, said vane slots from intervane spaces formed between said vane assemblies, said inner annular surface, and said end walls.

2. Sealing arrangement as claimed in claim 1 wherein each vane assembly comprises a connecting means located between said vane parts and supporting the same for relative movement toward and away from said guide faces.

3. Sealing arrangement as claimed in claim 1 wherein said connecting means includes spring means abutting the inner surfaces of said vane parts for urging the same apart and into engagement with said confronting guide faces.

4. Sealing arrangement as claimed in claim 1 wherein said vane parts of each vane assembly have inner confronting faces formed with confronting grooves, and wherein each vane assembly comprises a connecting pivot means located in said grooves and supporting said vane parts for relative pivotal movement.

5. Sealing arrangement as claimed in claim 1 wherein said vane parts of each vane assembly have inner confronting faces formed with confronting grooves, wherein each vane assembly comprises a connecting pivot means located in said grooves and supporting said vane parts for relative pivotal movement; and wherein said sealing means includes a slide shoe element mounted on said pivot means for angular movement relative to said vane parts, said slide shoe element having the same axial length as said inner annular surface and being in sliding and sealing contact with the same.

6. Sealing arrangement as claimed in claim 1 wherein said sealing means of each vane assembly includes two sealing members respectively mounted on said two vane parts, said sealing members having the same axial length as said annular inner surface and sliding on the same in sealing engagement.

7. Sealing arrangement as claimed in claim 6 wherein said vane parts have inner confronting faces formed with confronting grooves, and wherein said sealing members are mounted in said grooves, respectively, for angular movement relative to said vane parts.

8. Sealing arrangement as claimed in claim 1 wherein each of said vane parts has a sharp edge in sliding and sealing engagement with said inner annular surface and said confronting guide faces in the region of said slot extensions, said sharp edges forming said sealing means.

9. Sealing arrangement for a rotary fluid handling machine, in combination, rotor means having an axis and including a central rotor portion having open radial slots, and two end walls having slot extensions axially aligned with the ends of said slots, respectively, to form with the same vane slots, the axial and radial ends of said slot extensions being closed by surfaces of said end walls, each vane slot having circumferentially spaced confronting guide faces and a bottom face connecting said guide faces at the radially inner ends of said vane slots; housing means including a casing having an annular inner surface surrounding said central rotor portion and having the same axial extension, said casing being located between said end walls; and a plurality of vanes respectively located in said vane slots, each vane having such a thickness so as to fit fluid tight into the respective vane slot and having outer slide surfaces slidingly engaging said confronting guide faces, one of said slide surfaces having a sharp edge in sliding and sealing engagement with said annular inner surface and with said portions of said confronting guide surfaces in the region of said slot extensions for sealing said vane slots from intervane spaces formed between said vanes, said annular inner surface, and said side walls.

10. A vane assembly comprising two vane plates having confronting inner surfaces formed with confronting bearing grooves; a pivot means located in said bearing grooves and supporting said vane plates for relative pivotal movement; and a slide shoe element mounted on said pivot means for angular movement relative to said vane plates.

11. A vane assembly as claimed in claim 10 wherein each of said vane plates has two end portions, and a central portion between said end portions formed with a cutout; wherein said end portions have sharp sealing edges; and wherein said slide shoe element is located in said cutout between said end portions.

References Cited
UNITED STATES PATENTS

| | | | |
|---|---|---|---|
| 1,153,874 | 9/1915 | Shore | 230—152 |
| 1,204,535 | 11/1916 | Augustine | 230—152 |
| 2,264,616 | 12/1941 | Buckbee | 230—152 |
| 2,414,187 | 1/1947 | Borsting | 230—152 |
| 2,521,595 | 9/1950 | Miller | 230—152 |
| 2,590,730 | 3/1952 | Scognamillo | 103—136 |
| 2,731,920 | 1/1956 | Scognamillo | 103—136 |
| 2,938,468 | 5/1960 | Kececioglu et al. | 103—136 |
| 2,975,716 | 3/1961 | Eickmann | 103—136 |
| 3,099,964 | 8/1963 | Eickmann | 103—136 |

FRED C. MATTERN, JR., *Primary Examiner.*

WILBUR J. GOODLIN, *Assistant Examiner.*